United States Patent [19]
Watanabe et al.

[11] Patent Number: 5,983,744
[45] Date of Patent: *Nov. 16, 1999

[54] ROBOT APPARATUS FOR INSTALLING BOTH A ROBOT MOVABLE SECTION AND A ROBOT CONTROLLER

[75] Inventors: Atsushi Watanabe, Yamanashi; Ryo Nihei; Akihiro Terada, both of Fujiyoshida; Masatoshi Ito, Yamanashi, all of Japan

[73] Assignee: Fanuc Ltd., Yamanishi, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/855,574

[22] Filed: May 13, 1997

Related U.S. Application Data

[63] Continuation of application No. 08/460,067, Jun. 2, 1995, abandoned.

[30] Foreign Application Priority Data

Jun. 23, 1994 [JP] Japan ................................. 6-141307

[51] Int. Cl.[6] ...................................................... B25J 9/00
[52] U.S. Cl. .................................... 74/490.02; 74/490.01; 901/14
[58] Field of Search ........................... 74/490.01, 490.02, 74/490.03, 490.05, 490.06; 62/259.2; 165/80.3; 901/2, 14, 15, 16, 19, 49

[56] References Cited

U.S. PATENT DOCUMENTS

| | | | |
|---|---|---|---|
| 4,659,279 | 4/1987 | Akeel et al. | 414/680 |
| 4,693,663 | 9/1987 | Brenholt et al. | 901/15 |
| 4,705,243 | 11/1987 | Hartmann et al. | 248/51 |
| 4,904,148 | 2/1990 | Larsson | 901/15 |
| 4,972,731 | 11/1990 | Akutagawa et al. | 74/490.03 |
| 5,108,789 | 4/1992 | Michael et al. | 427/164 |
| 5,220,484 | 6/1993 | Seri | 165/80.3 |
| 5,267,121 | 11/1993 | Uchida et al. | 165/80.3 |
| 5,413,454 | 5/1995 | Movsesian | 901/15 |
| 5,421,218 | 6/1995 | Akeel et al. | 74/490.2 |
| 5,440,916 | 8/1995 | Stone et al. | 901/49 |
| 5,484,012 | 1/1996 | Hiratsuka | 165/80.3 |
| 5,495,392 | 2/1996 | Shen | 165/80.3 |

FOREIGN PATENT DOCUMENTS 5-259635  10/1993  Japan .

*Primary Examiner*—Lenard A. Footland
*Assistant Examiner*—David Fenstermacher
*Attorney, Agent, or Firm*—Staas & Halsey LLP

[57] ABSTRACT

A robot apparatus having no need for securing a space for installing both a robot movable section and a robot controller. The robot apparatus includes a frame having strength enough to support the robot movable section, and containing the robot controller therein. The robot movable section is installed on the frame. The robot controller and the robot movable section are electrically connected to each other via a coupling cable passing through a hole formed inside. Over the base of the robot movable section, first, second and another arms are provided via rotating mechanism portions. The distal end of the third arm constitutes a wrist portion of a robot. Various types of hands are attached to this wrist portion. Thus, the robot movable section can be installed on the frame containing the robot controller.

7 Claims, 6 Drawing Sheets

ROBOT APPARATUS FOR INSTALLING
BOTH A ROBOT MOVABLE SECTION AND
A ROBOT CONTROLLER

This application is a continuation, division, of application Ser. No. 08/460,067, filed Jun. 2, 1995, now abandoned.

BACKGROUND OF THE INVENTION (1) Field of the Invention

A present invention relates to a robot apparatus and, more particularly, to a robot apparatus in which a robot movable section and a robot control section are adjacently disposed.

(2) Description of the Related Art

A conventional robot apparatus has a robot movable section and a robot controller which are separated from each other, and the robot movable section and the robot controller are electrically connected to each other via a coupling cable. Thus, the robot controller makes the robot movable section perform an arbitrary motion by giving a motion command to the robot movable section.

One method of connecting the robot movable section and the robot controller is by installing the robot controller at a place distant from the robot movable section and by connecting the robot movable section and the robot controller to each other via a long coupling cable. With this method, a space for installing the robot controller must be provided additionally. Further, a facility for protecting the coupling cable is needed. Therefore, the method of connecting the robot movable section with the robot controller, which is positioned apart therefrom, by using a long cable is disadvantageous in terms of effective use of limited space and facility.

To overcome this disadvantage, a method can be used in which the robot movable section and the robot controller are directly connected to each other by means of connectors which both of the robot movable section and the robot controller have, without the use of a cable. With this method, the robot controller is installed adjacent to the robot movable section in a dead space outside the work envelope of the robot movable section.

FIG. 6 shows a conventional robot apparatus. In this figure, a robot controller, contained in a housing 100a, is installed adjacent to a robot movable section 10a. The robot controller and the robot movable section 10a are electrically connected to each other via a connector 114a provided on the housing 100a and a connector 12a provided on the back side of the robot movable section 10a.

The robot movable section 10a is fixed to the floor via a base 11a. On the base 11a, a J1 arm 17a is provided via a rotating mechanism portion. At the distal end of the J1 arm 17a, a J2 arm 13a is provided via the rotating mechanism portion. Further, at the distal end of the J2 arm 13a, a J3 arm 14a is provided via the rotating mechanism portion. The distal end of the J3 arm 14a constitutes a wrist portion 15a. Various types of hands can be attached to this wrist portion 15a. The central position of the wrist portion is called TCP (Tool Center Point). The TCP can move in a region inside a work envelope 20a. Hereinafter, "the work envelope of robot" refers to a range in which the TCP moves.

Thus, the housing 100a containing the robot controller is reduced in size so that it can be installed outside the range 20a in which the TCP moves, by which the robot controller can be installed close to the robot movable section. As an example of this configuration, the applicant has filed Japanese Patent Application No. 5-259635.

However, for the space to install the robot controller, a space in which both of the robot movable section and the robot controller can be installed must be secured. Therefore, a broad installation space is needed. Also, in order to increase the work envelope of the robot, the space occupied by the robot controller must be decreased.

Moreover, as the application of the robot apparatus is diversified, the decrease in the installation area for the robot apparatus and the expansion of the work envelope of the robot are demanded. For example, when a production line at a factory using robot apparatuses is laid out, the less the installation area for the robot apparatus is, the more freely work benches or the like can be arranged around the robot apparatus. Further, by expanding the work envelope of the robot, the space around the robot can be used effectively, by which the flexibility of the layout is increased. Therefore, a layout which brings about improved productivity can be achieved.

SUMMARY OF THE INVENTION

The present invention has been made in view of the above circumstances, and it is an object of the present invention to provide a robot apparatus having no need for securing a space for installing both of a robot movable section and a robot controller.

To achieve the above object, the present invention provides a robot apparatus in which motion control is performed by a robot controller connected electrically to a robot movable section via a coupling cable, comprising a frame containing the robot controller therein and having a hole for passing the coupling cable on the top thereon and a robot movable section installed on the frame and connected to the robot controller via the coupling cable inserted through a hole formed at the bottom thereof.

The robot movable section is installed on the frame containing the robot controller. The coupling cable from the robot controller is inserted in the robot movable section through the hole on the top of the frame and the hole at the bottom of the robot movable section and connected to the robot movable section.

Thus, the robot movable section can be installed on the frame containing the robot controller therein in a stacked manner.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENT

An embodiment of the present invention will be described with reference to the drawings.

Figure 1:
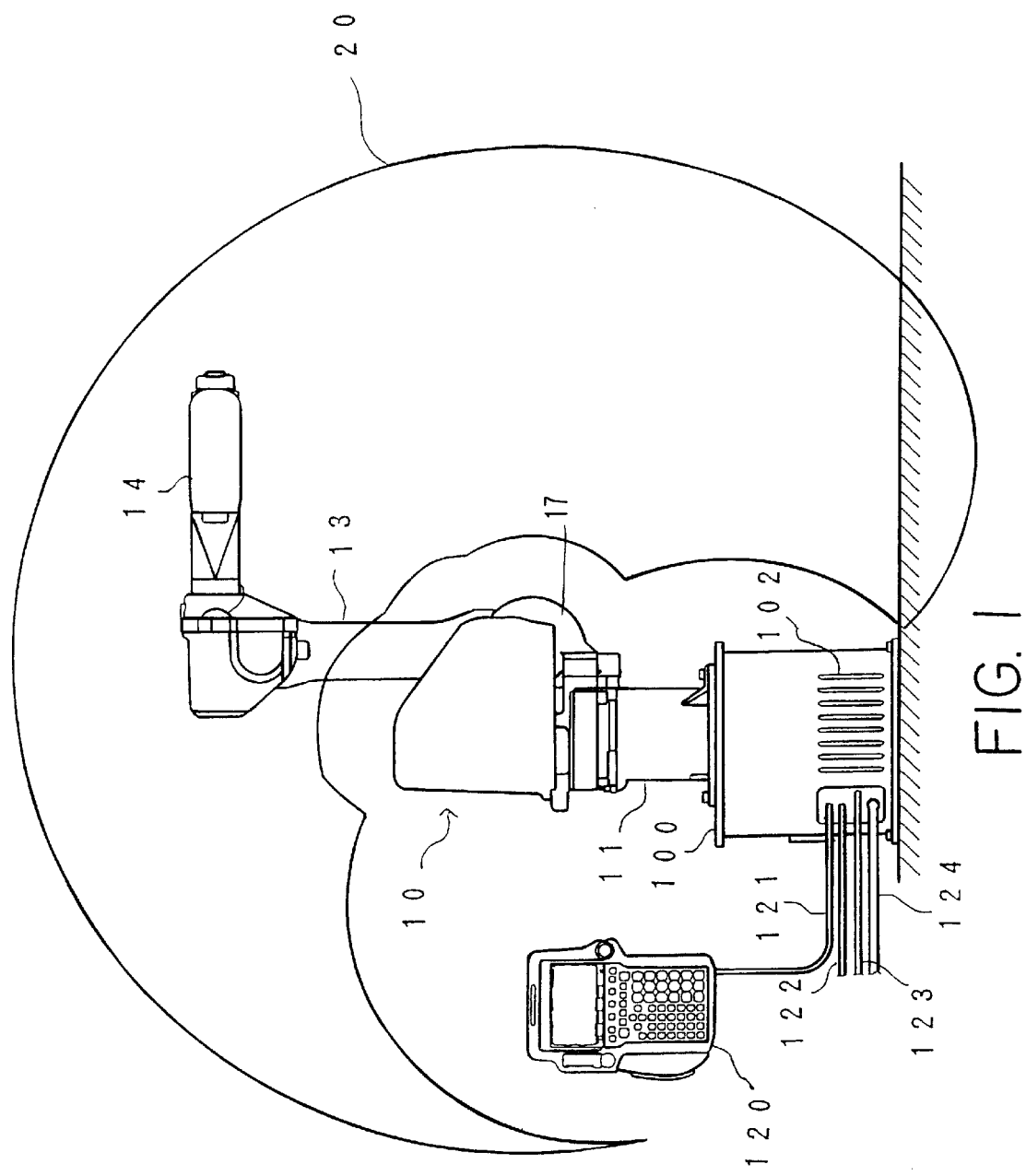
FIG. 1 is a view showing the configuration of a robot apparatus in accordance with the present invention.

FIG. 1 is a view showing the configuration of the robot apparatus in accordance with the present invention. A frame 100, having a strength enough to support a robot movable section 10, contains a robot controller therein. The robot movable section 10 is installed on the frame 100. A base 11 of the robot movable section 10 is shorter than the conventional base by the height of the frame 100. The height of each rotation axis positioned over the base 11 is the same as that of the conventional rotation axis. The robot controller and the robot movable section are connected by using a coupling cable passing through a hole formed inside. On the base 11 of the robot movable section 10, a J1 arm 17 is provided via a rotating mechanism portion. At the distal end of the J1 arm 17, a J2 arm 13 is provided via the rotating mechanism portion. Further, at the distal end of the J2 arm 13, a J3 arm 14 is provided via the rotating mechanism portion. The distal end of the J3 arm 14 constitutes a wrist portion of the robot, which accommodates a hand suitable for the work. Various kinds of work can be done by the hand which can be attached appropriately. A TCP (Tool Center Point), a central position of the wrist portion, can move within a region inside a work envelope 20.

From the frame 100, a cable 121 for connecting a teaching panel, a hose 122 for inputting cooling air, a hose 123 for outputting cooling air, and a power supply cable 124 for supplying power for the entire robot apparatus which extends to the outside. A connecting teaching panel 120 is connected to the robot controller in the frame 100 via the cable 121 for connecting teaching panel. Cooling air sprayed into the inside of the frame 100 through the hose 122 for inputting cooling air is discharged to the outside through the hose 123 for outputting cooling air. At the side of the frame 100, cooling fins 102 are provided.

As described above, the robot movable section 10 can be installed on the frame 100, which contains the robot controller, in a stacked manner. Therefore, only a floor area equivalent to the bottom area of the frame 100 is required to install the robot apparatus. Also, in this robot apparatus, since the robot controller is situated under the robot movable section 10, the robot controller does not disturb the motion of the robot movable section, so that a sufficiently broad work envelope 20 of TCP can be provided.

Figure 2:
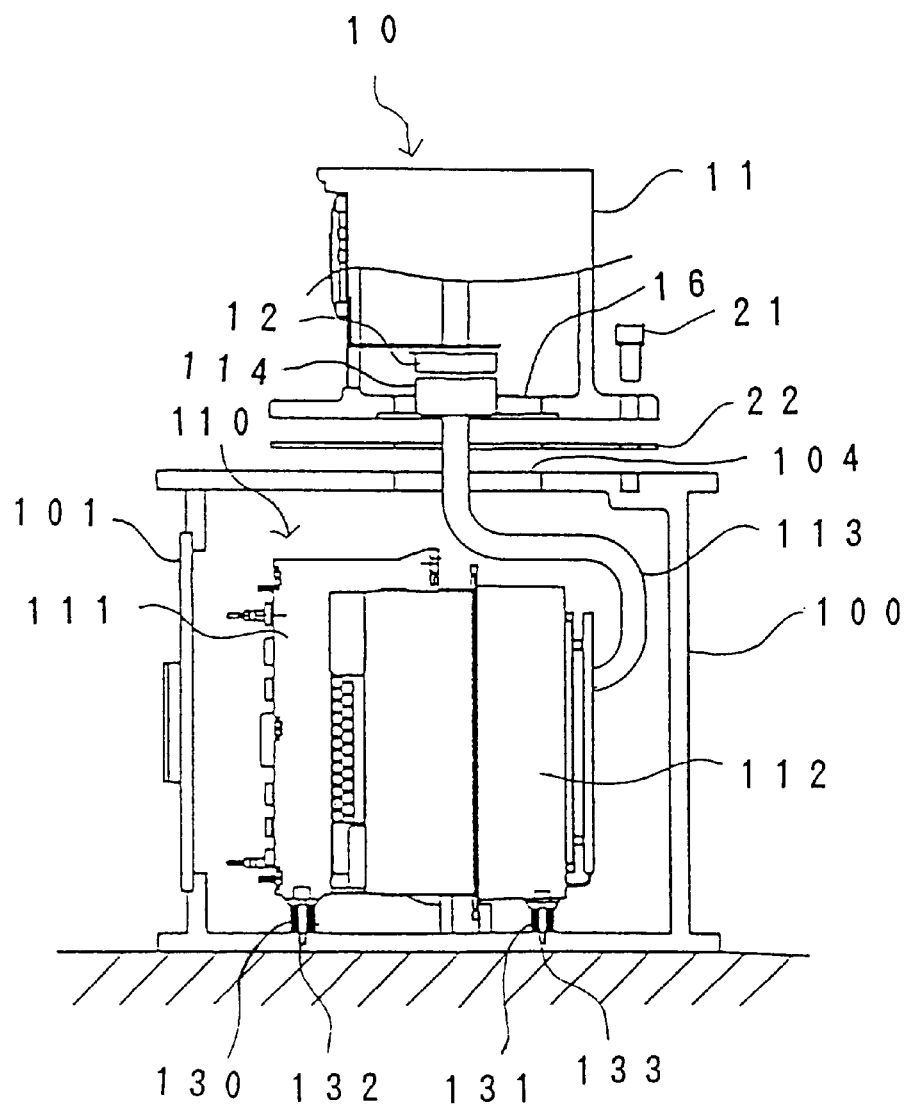
FIG. 2 is a view showing the internal configuration of a frame and how a robot movable section is installed on the frame.

FIG. 2 is a view showing the internal configuration of a frame and how a robot movable section is installed on the frame. The frame 100, containing the robot controller 110 therein, has a strength enough to fix the robot movable section 10 thereon. At the side of the frame 100, a door 101 is provided. The robot controller 110 contained in the frame 100 comprises a main control panel 111 on which various control circuits are mounted and a servo amplifier 112. The robot controller 110 is fixed to the frame 100 by fixing bolts 132 and 133 with vibration absorbers 130 and 131 made of rubber or the like being held between the robot controller 110 and the frame 100. A coupling cable 113 for connecting the robot controller 110 to the robot movable section 10 extends to a position above the frame 100 through a hole 104 on top of the frame 100.

At the bottom of the base 11 of the robot movable portion 10, a hole 16 for inserting the coupling cable 113 is formed, and a connector 12 for connecting the coupling cable 113 is provided at the inner portion of the base 11.

When the robot movable section 10 is installed on the frame 100, the base 11 of the robot movable section 10 is fixed to the frame 100 by a bolt 21 with a packing 22 being held between the base 11 and the frame 100 for eliminating a gap and for sealing. Although only one bolt is shown in this figure, a number of bolts are actually used for fixing. The coupling cable 113 is inserted in the base 11 through the hole 16 at the bottom of the base 11, and a connector 114 of the coupling cable 113 is connected with the connector 12 of the robot movable section 10 in the base 11.

As described above, the robot controller 110 can be installed in the frame 100, and the robot removable section 10 can be installed on the frame 100. The vibration absorbers 130 and 131 held between the robot controller 110 and the frame 100 serve to prevent the vibration generated during the motion of the robot movable section 10 from being transmitted to the robot controller 110. Further, the coupling cable 113 is not exposed to the outside because it is inserted through the bottom plate of the robot movable section 10 to connect the robot controller 110 with the robot movable section 10.

Figure 3:
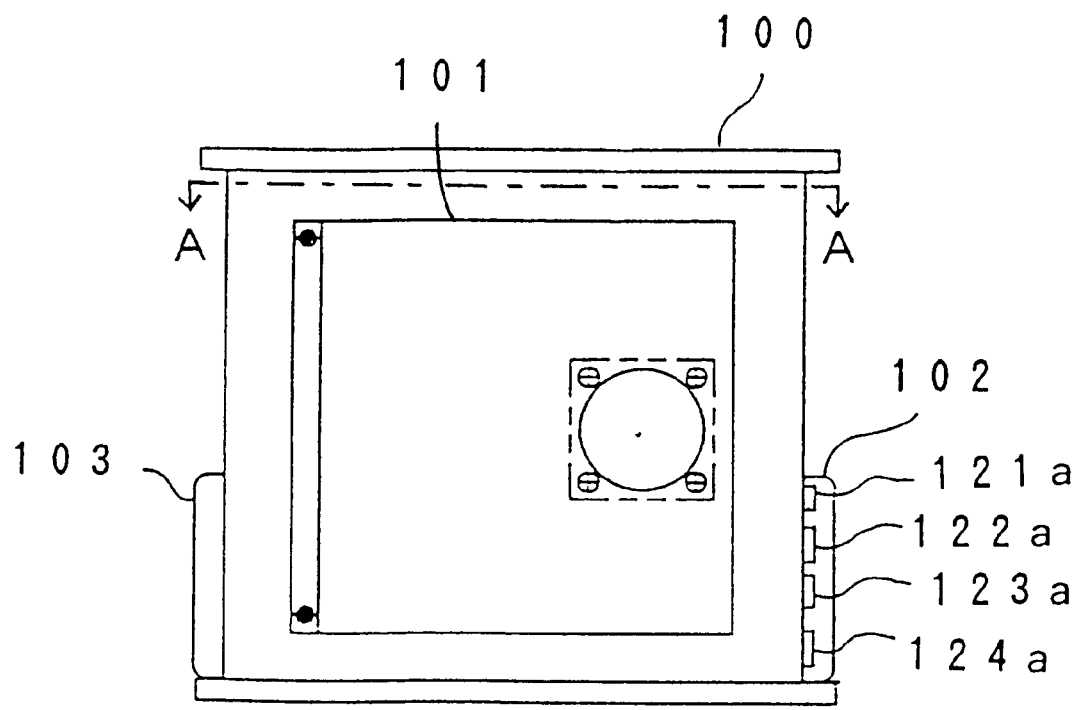
FIG. 3 is a side view of the frame.

FIG. 3 is a side view of the frame 100 viewed from the left side of the robot apparatus shown in FIG. 1. A door 101 is provided in the center of the frame 100, and cooling fins 102 are provided at the side. At the lower right are arranged inlets and outlets for various cables; an outlet 121a for the cable 121 for the teaching panel, an inlet 122a for cooling air, an outlet 123a for cooling air, and an outlet 124a for the power supply cable are arranged in the named order from up to down.

Next, a construction for cooling the robot apparatus by using cooling air will be described in detail.

Figure 4:
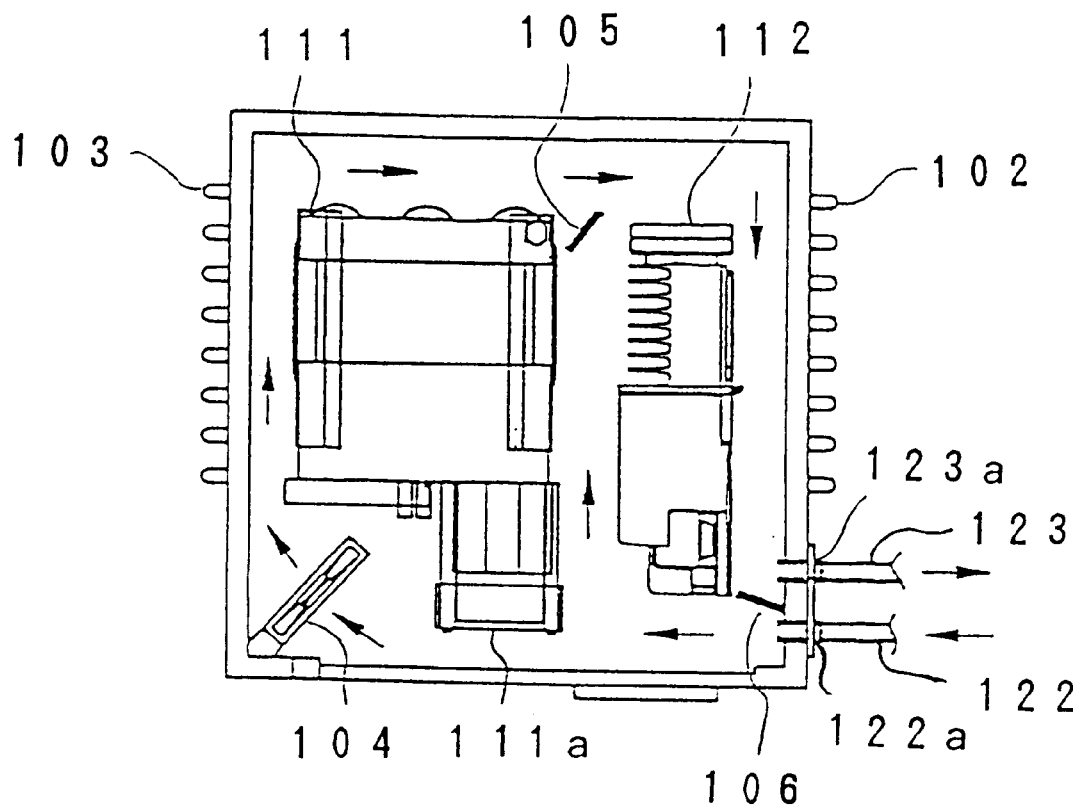
FIG. 4 is a sectional view of the frame taken along the line A—A of FIG. 3.

FIG. 4 is a sectional view of the frame taken along the line A—A of FIG. 3. Referring to FIG. 4, in the frame 100, the main control panel 111 for the robot apparatus is provided on the left side, and the servo amplifier 112 on the right side. The portion protruding from the front surface of the main control panel 111 is a transformer 111a.

In the right front in FIG. 4, the inlet 122a for cooling air and the outlet 123a for cooling air are arranged horizontally, and an air guide plate 106 is provided between them to circulate air smoothly. The hose 122 for inputting cooling air is connected to the inlet 122a, and the hose 123 for outputting cooling air is connected to the outlet 123a.

At the corner in front of the inlet 122a for cooling air, a fan 104 is provided for forcedly circulating cooling air. Further, an air guide plate 105 is provided between the main control panel 111 and the servo amplifier 112.

At the right and left on the outside of the frame 100, cooling fins 102 and 103 for dissipating heat are provided.

Next, how the inputted cooling air flows in the above-described construction will be described. In FIG. 4, the direction in which cooling air flows is indicated by arrows.

The cooling air sent through the hose 122 is fed into the frame 100 through the inlet 122a. The fed air goes straight by the air guide plate 106 installed at the side of the inlet 122a. Then, the cooling air is branched into the cooling air passing through a space between the main control panel 111 and the servo amplifier 112 and the cooling air passing through a space between the main control panel 111 and the inside wall of the frame 100.

The flow of the cooling air passing through the space between the main control panel 111 and the servo amplifier 112 changes its direction toward the outlet 123a by the air guide plate 105. The air passing through the space between the main control panel 111 and the inside wall of the frame 100, whose flow velocity is increased by the fan 104, is sent to the outlet 123a for cooling air along the inside wall of the frame 100.

Thus, the main control panel 111 and the servo amplifier 112 can be cooled by circulating air in the frame 100. The cooling fins 102 and 103 installed on the outside of the frame 100 further improve the cooling efficiency.

Further, the cooling effect can be enhanced by changing the positions of the air guide plates 104 and 105 and the position and strength of the fan 104 in response to the shapes and sizes of the main control panel 111 and the servo amplifier 112 or the installation position thereof.

Although a case in which the robot movable section is installed on the frame has been explained in the above embodiment, the robot movable section can be installed apart from the frame by providing an opening on the side of the base 11 for introducing the connector of the robot movable section to the outside.

Figure 5:
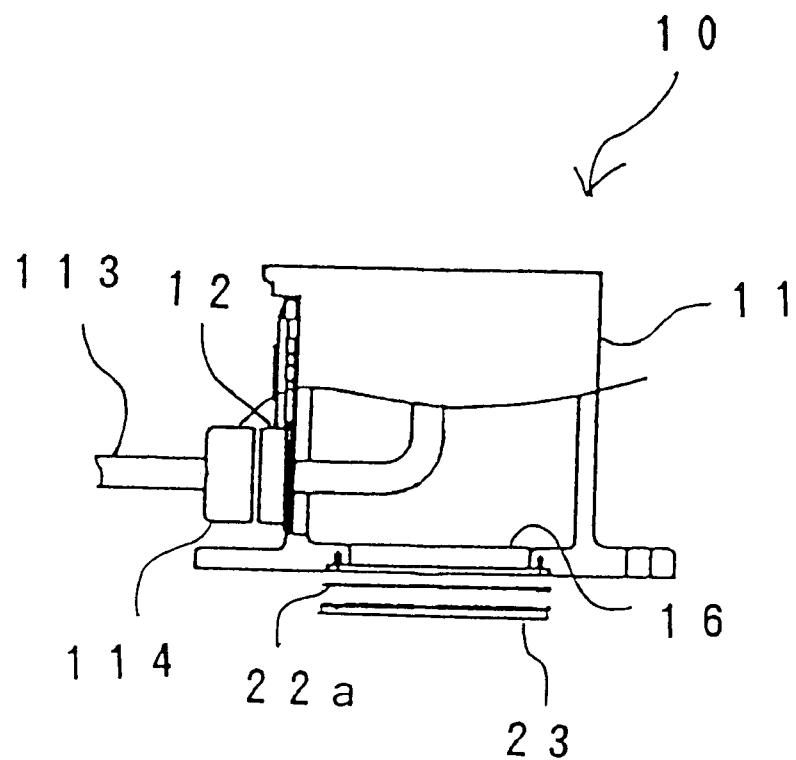
FIG. 5 is a view showing the robot movable section installed apart from the frame.
Figure 6:
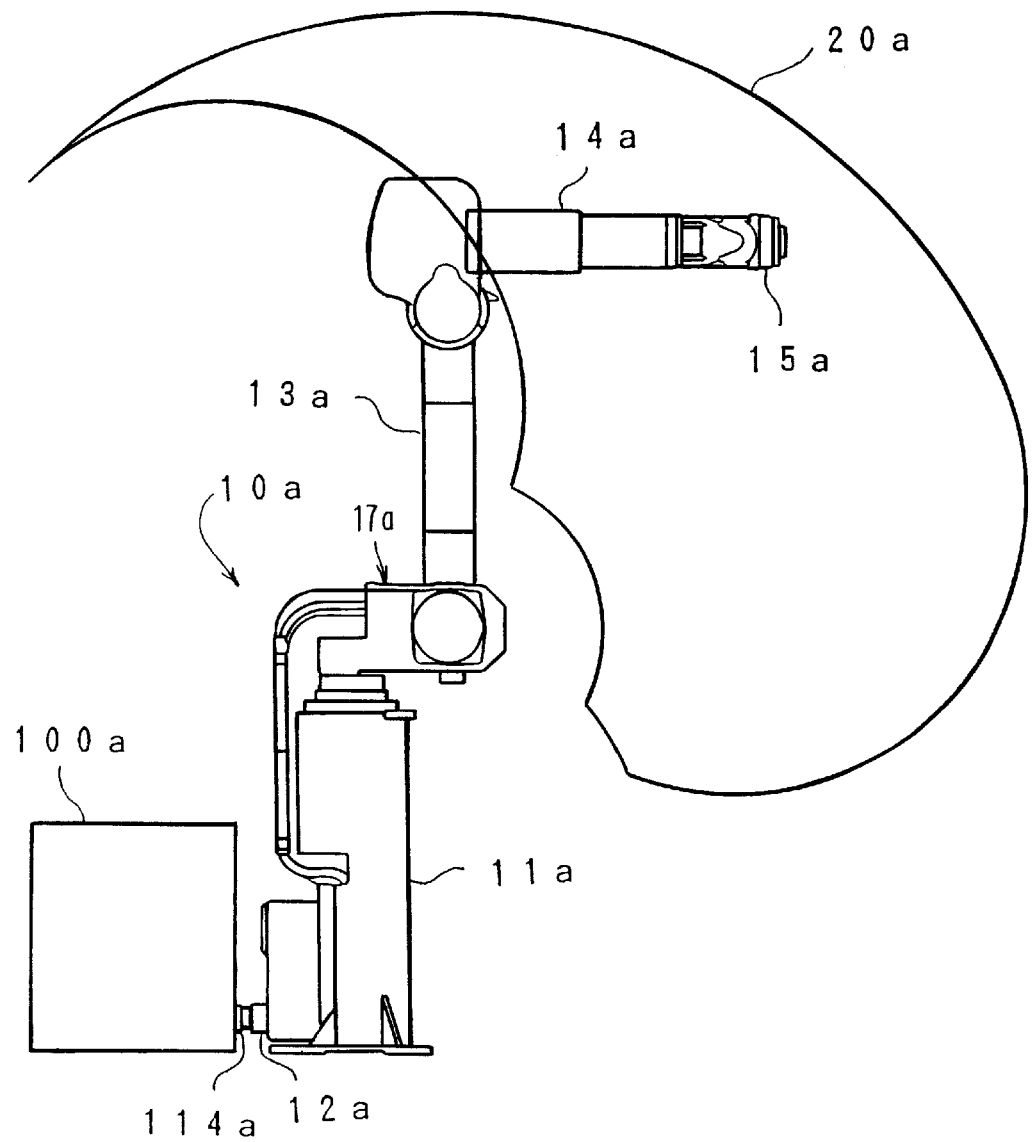
FIG. 6 is a view showing a conventional robot apparatus.

FIG. 5 is a view showing the robot movable section installed apart from the frame. In FIG. 5, the connector 12 of the robot movable section 10 is fixed to the side of the base 11 by screws or the like. The connector 114 of the coupling cable 113 is connected to the connector 12 of the robot movable section 10.

At the bottom of the base 11, there is a hole 16 for inserting the coupling cable when the robot movable section is installed on the frame. The hole 16 is closed by fixing a panel 23 with a packing 22a being held between the base bottom and the panel 23.

Since the connector 12 can also be installed on the side of the base 11, the robot movable section 10 may be installed on the frame or apart from the frame. Therefore, the robot apparatus can be installed more flexibly. For example, if the overhead space cannot be secured sufficiently, the robot movable section is lowered from the frame, and if the floor area for installing the robot apparatus cannot be secured sufficiently, the robot movable section is installed on top of the frame.

As described above, according to the present invention, since the robot movable section can be installed on the frame containing the robot controller in a stacked manner, the need for providing a space for installing both of the robot movable section and the robot controller is eliminated, so that the limited site or space can be used effectively.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A robot apparatus having a robot movable section which has a base and a robot controller for performing motion control of said robot movable section, comprising:

a frame defining a first area, having a top surface, containing said robot controller and having a hole in said top surface for passing a coupling cable therethrough;

wherein said robot movable section defines a second area, has a bottom surface and a hole formed in the bottom surface, is installed on the said top surface of said frame, and is connected to said robot controller via said coupling cable inserted through the hole in the bottom surface, wherein said coupling cable is contained within the first and second areas; and said frame is installed so as not to interfere with a work envelope of said robot moveable section.

2. A robot apparatus according to claim 1, further comprising a cooling device connected to the frame for circulating air to cool said robot controller within said frame.

3. A robot apparatus according to claim 2, wherein said frame further comprises a fan for forcedly circulating the cooling air within the frame.

4. A robot apparatus according to claim 1, further comprising vibration absorbers positioned between said frame and said robot controller to prevent vibration resulting from motion of said robot movable section from being transmitted to the robot controller.

5. A robot apparatus as claimed in claim 1, further comprising:

cooling fins disposed on an exterior of said frame to dissipate heat;

an inlet to allow cooling air to enter the frame and;

an outlet to allow warmed cooling air to exit the frame.

6. A robot apparatus as claimed in claim 1, further comprising fins attached to an exterior of said frame for dissipating heat.

7. A robot apparatus, comprising:

a robot movable section having a base;

a robot controller for performing motion control of said robot movable section; and a frame containing said robot controller and having a top, wherein said robot movable section is installed on said top of said frame, is connected to said robot controller by a coupling cable inserted through a hole in said top of said frame, wherein said robot movable section is installed on a floor, and is connected to a connector affixed to a side of said base of said robot movable section by the coupling cable inserted through a hole formed in said side of said base, and wherein said frame is installed so as not to interfere with a work envelope of said robot moveable section.

* * * * *